Oct. 12, 1965  J. M. SHUBIN  3,211,309
RUBBISH COLLECTING VEHICLE WITH LOADING AND PACKING APPARATUS
Filed March 20, 1963  3 Sheets-Sheet 1
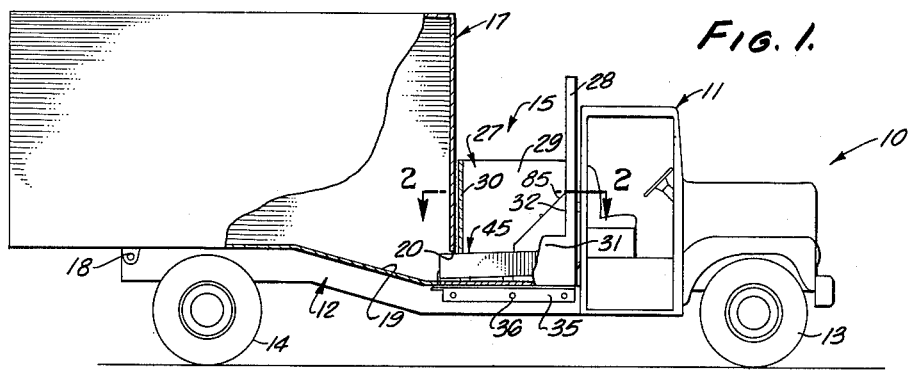
Fig. 1.
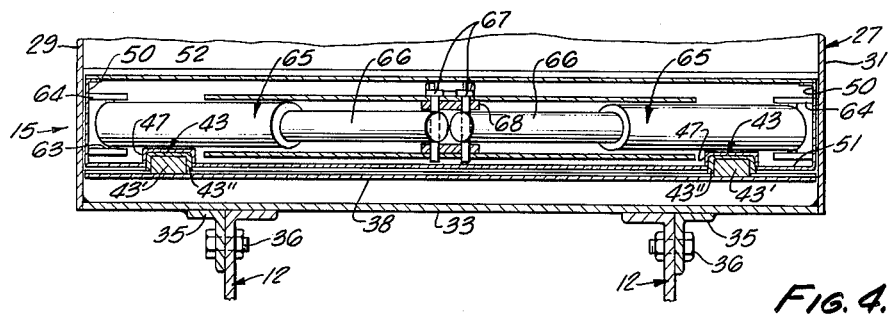
Fig. 4.
Fig. 5.
Fig. 6.
Fig. 7.
INVENTOR.
JOHN M. SHUBIN
BY
ATTORNEY.

Oct. 12, 1965  J. M. SHUBIN  3,211,309
RUBBISH COLLECTING VEHICLE WITH LOADING AND PACKING APPARATUS
Filed March 20, 1963  3 Sheets-Sheet 2

INVENTOR.
JOHN M. SHUBIN
BY
ATTORNEY.

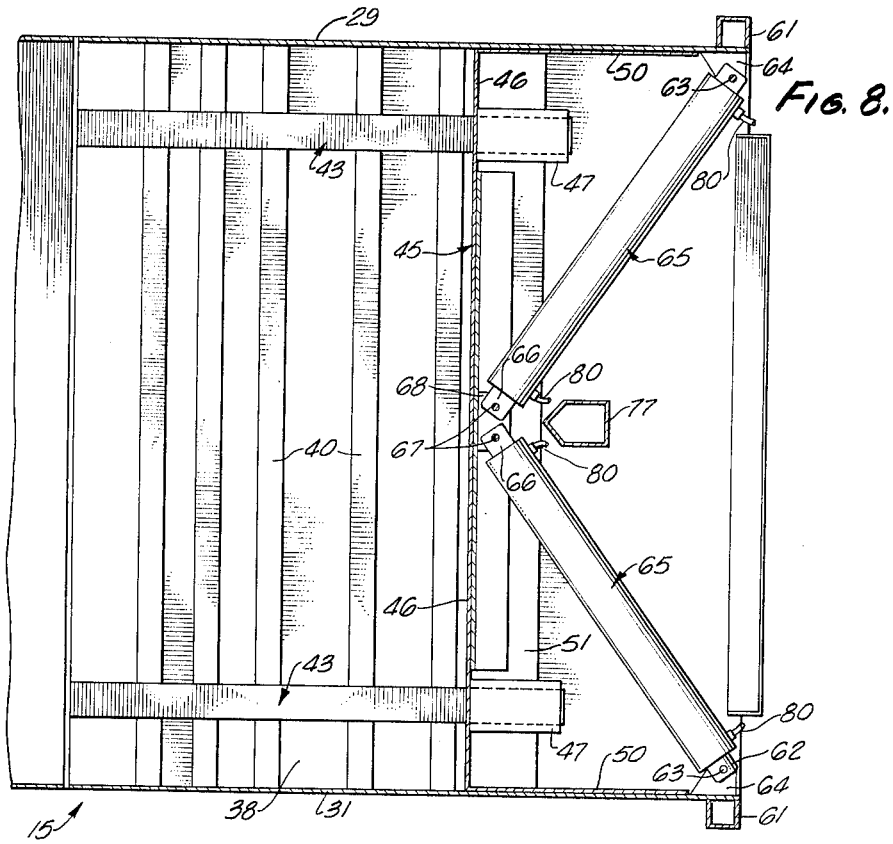
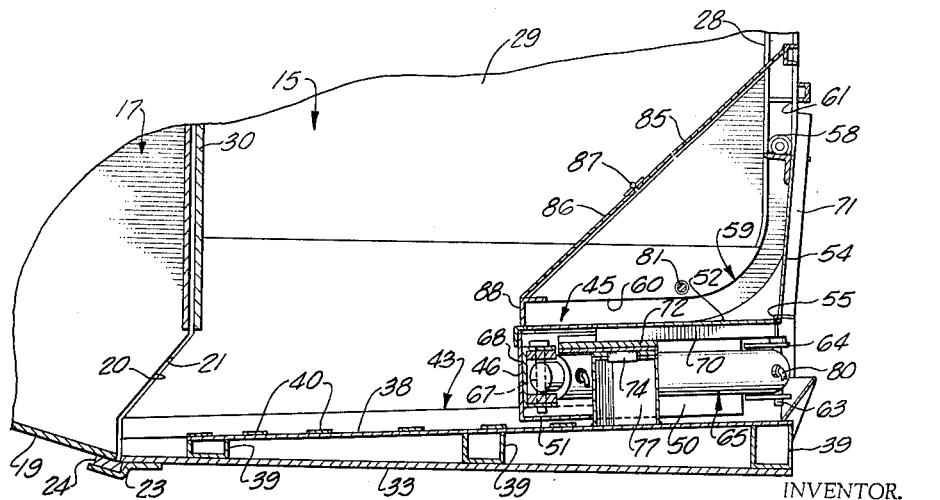

United States Patent Office 3,211,309
Patented Oct. 12, 1965

3,211,309
RUBBISH COLLECTING VEHICLE WITH LOADING AND PACKING APPARATUS
John M. Shubin, San Pedro, Calif., assignor of fifty percent to Peter S. Shubin, Huntington Beach, Calif.
Filed Mar. 20, 1963, Ser. No. 266,540
15 Claims. (Cl. 214—83.3)

This invention relates to rubbish collecting vehicles and more particularly to a vehicle of this type featuring an improved front loading and packing apparatus which is self-contained and mountable as a unit immediately rearward of the vehicle driver's cab and having a simpler, more rugged, and more efficient and effective packer housed entirely or substantially therewithin.

Prior proposals made for loading devices positioned at the front of the main refuse storage compartment are subject to certain disadvantages sought to be avoided by the present invention. In one type of construction the packer and loader are integrally attached to the forward end of the storage compartment and must be elevated along therewith when discharging the collected refuse. The obvious disadvantages of this arrangement are avoided by the construction shown in my prior Patent No. 2,961,-105 granted November 22, 1960, for Refuse Vehicle and Loading Apparatus Therefor wherein some of the components are necessarily located in the driver's cab area thereby necessitating changes in standard chassis and cab design. Components located beneath the cab are not readily accessible for servicing and costly operations are involved when installing and removing the packer.

A further disadvantage of prior packer constructions of the front loading type is that they are so designed as to utilize an objectionable amount of space and interfere with the compact design of the customary chassis components and entail needless costs for materials, assembly of the components and normal servicing activities.

In view of the foregoing and other disadvantages and shortcomings of prior refuse transporting equipment, it is a primary object of the present invention to provide a greatly simplified, unitized design embodying two principal components comprising a rearwardly tiltable storage compartment supported on the rear of the truck chassis and a self-contained compactly designed, high efficiency packer and loader rigidly securable as a unit to a standard truck chassis immediately rearward of the driver's cab without need for altering the cab or chassis construction in any except very minor respects. In the last mentioned connection reference is had to the provision of mounting brackets and other securing devices necessary to anchor the packer to the chassis and the necessary hydraulic connections to the vehicle power take-off facilities.

One of the particularly important features of the packer is the use of a pair of pressure-operated cylinders disposed at an angle to one another and to the longitudinal axis of the chassis and arranged to operate the packer and loading piston more efficiently and effectively. This arrangement provides a longer piston stroke yet minimum utilization of space in the retracted position of the piston. It is found that this arrangement of the packer driving cylinders provides a highly effective packer and refuse loader without need for extending the forward end of the cylinders beneath the driver's cab and has other structural and functional advantages which will become apparent when considering the drawings and the accompanying detailed description of a preferred embodiment.

Another feature of the invention is the provision of a packer piston the top side of which forms the bottom of the loading bin in the extended position of the piston and which automatically collapses to occupy a storage position at the forward portion of the packer apparatus as the piston approaches its retracted position. This expedient permits the use of a long stroke piston in a minimum space lengthwise of the vehicle and possesses readily recognized advantages over packer pistons heretofore proposed.

It is therefore a principal object of the present invention to provide a front loading refuse transporting vehicle featuring an improved combined refuse packer and loader occupying a minimum of space between the vehicle cab and the storage chamber proper.

Another object of the invention is the provision of a self-contained unitary packer and refuse transfer unit designed to be installed as a unit rearward of a vehicle driver's cab and rigidly secured to the chassis frame independently of the refuse storage chamber.

Another object of the invention is the provision of a refuse packer and transfer device having improved compact fluid-operated means for operating the packer piston utilizing a minimum of space and which means forms a unitary part of the packer device.

Another object of the invention is the provision of a refuse packer and transfer piston sub-assembly and including as a part thereof a pair of fluid-operated driving cylinders disposed at an angle to one another as well as to the axis of piston travel.

Another object of the invention is the provision of an improved refuse packer and transfer piston sub-assembly having a wide flat top wall formed in two major parts together with means for shifting one of these parts to an alternate position as an incident to the retraction of the packer piston and for restoring the movable part to supplement the other part of the piston top in the extended position of the piston.

Other objects of the invention include provision of miscellaneous design features augmenting the utility effectiveness, efficiency and over-all serviceability of a refuse packer and transfer device.

These and other more specific objects will appear upon reading the following specification and claims and upon considering in connection therewith the attached drawings to which they relate.

Referring now to the drawings in which a preferred embodiment of the invention is illustrated:

FIGURE 1 is a side elevational view of a refuse pickup vehicle incorporating a preferred embodiment of this invention and having parts broken away to show constructional details;

FIGURE 4 is a cross-sectional view through the forward end of the packer piston taken along line 4—4 on FIGURE 3;

FIGURE 5 is a fragmentary transverse sectional view on an enlarged scale taken along line 5—5 on FIGURE 2;

FIGURE 6 is a fragmentary sectional view on an enlarged scale taken along line 6—6 on FIGURE 2;

FIGURE 7 is a vertical sectional view on an enlarged scale taken along line 7—7 on FIGURE 3;

FIGURE 8 is a view similar to FIGURE 2 but showing the position of packer piston and its operating cylinders under fully retracted conditions; and FIGURE 9 is a cross-sectional view similar to FIGURE 3 but showing the position of the parts with the packer piston fully retracted.

Figure 2:
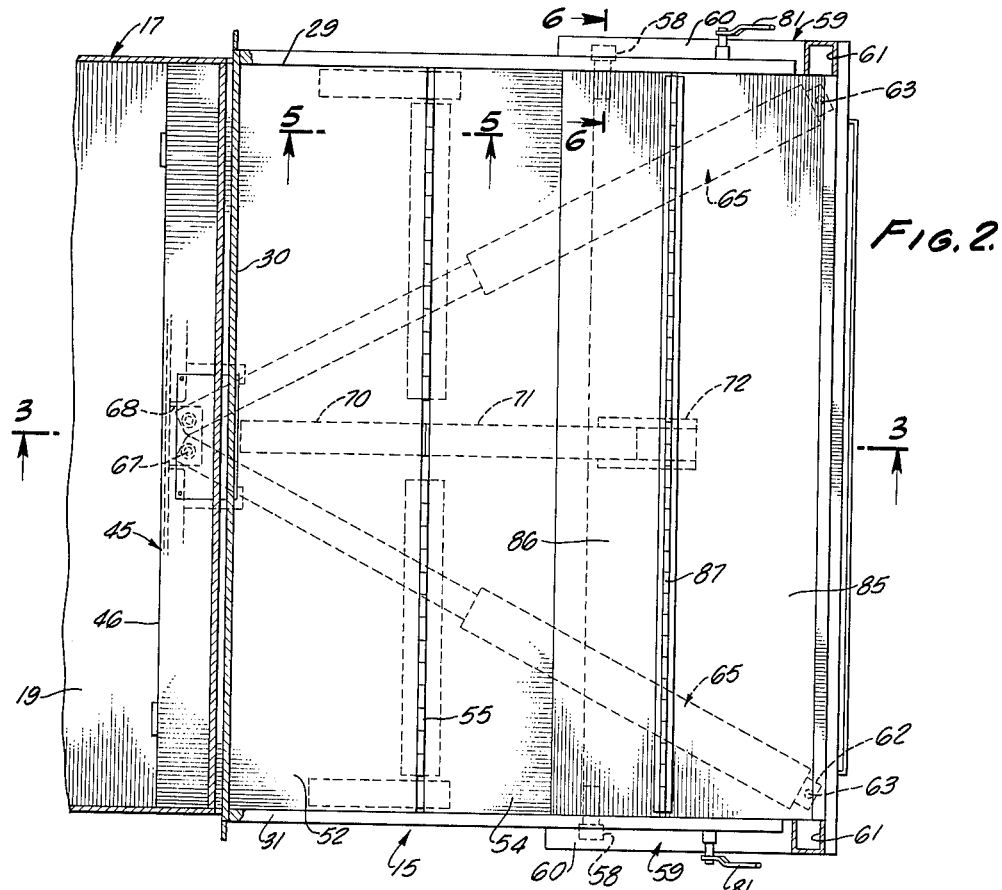
FIGURE 2 is a cross-sectional view on an enlarged scale taken along line 2—2 on FIGURE 1.

Referring initially more particularly to FIGURE 1, there is shown a preferred embodiment of the present invention mounted on a conventional truck chassis 10 having a driver's cab 11 and a main frame 12 mounted on front wheels 13 and rear wheels 14. The unitary combined packer and refuse device, designated generally 15, is confined to the relatively small area between the rear wall of cab 11 and the forward end wall of a refuse storage compartment 17. It will be understood that the latter preferably is pivotally supported on hinges 18 having an axis extending transversely of the rear end of chassis frame 12. This storage bin is provided with any suitable conventional type of elevating means for tilting its forward end upwardly to discharge its contents by gravity when the normally closed doors at the rear end are opened.

Storage compartment 17 comprises a large capacity chamber having the general configuration shown in FIGURE 1 and including an upwardly and rearwardly inclined bottom wall 19 normally directly supported by frame 12 and provided at its lower forward corner with a low height cutout opening 20 having edges complemental to the adjacent edges of the packer outlet opening 21 and more clearly shown in FIGURE 9. Desirably the adjacent marginal edges of the packer apparatus are provided with strip means 23 supporting suitable resilient weather stripping 24. It will be understood that this weather stripping preferably extends not only across the underside of the packer but also along its opposite sides.

Unitary packer apparatus 15 is generally rectangular in configuration and the principal component of its main body comprises an open top bin 27 formed of heavy gauge plate metal welded together. This bin has extra high front wall 28 desirably extending above the top of cab 13, a side wall 29, a rear end wall 30 of the same height, and a relatively low side wall 31 on the curb side of the vehicle. The latter side wall is provided with a large area cutout 32 through which refuse is charged into the bin. The heavy plate metal bottom 33 of bin 27 (FIGURE 4) is here shown as resting directly on main frame members 12 of the chassis to which packer 15 is rigidly anchored as by bracket members 35 welded or otherwise rigidly secured to the bottom of the apparatus. This bracket is detachably anchored to the chassis as by bolts 36.

Figure 3:
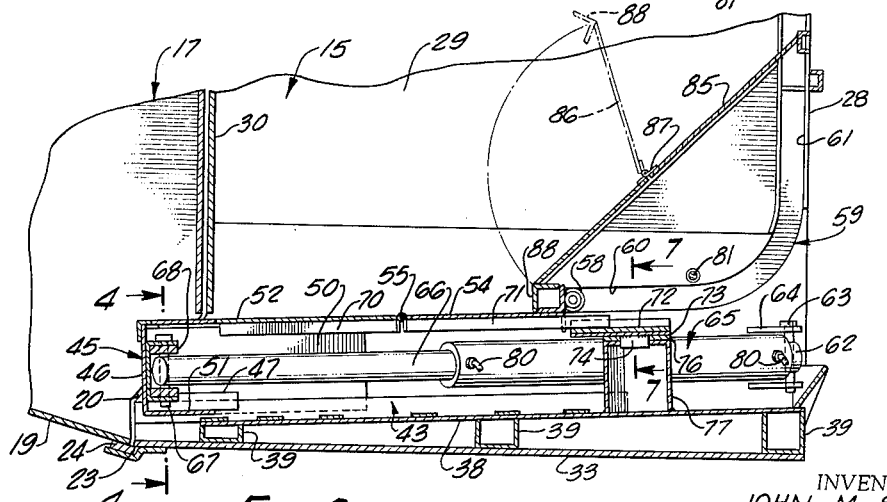
FIGURE 3 is a vertical sectional view taken along line 3—3 on FIGURE 2.

Referring next to FIGURES 3 and 9, it is pointed out that the interior of bin 27 is provided with a second or interior bottom 38 formed of sheet metal and welded or otherwise secured to channel members 39 of graduated heights extending transversely of bottom 33. As a consequence, it will be understood that bottom 38 is inclined downwardly and rearwardly toward refuse opening 20 of storage compartment 17. This arrangement provides for desirable drainage aids in feeding the refuse by gravity downwardly and rearwardly toward the storage compartment and into transfer position forwardly of the packer piston. Bottom 38 may be provided with thin strip cleats spot welded, riveted, or otherwise secured to its upper surface and serving to strengthen it as well as having other purposes.

Welded to the upper side of bottom 38 are a pair of guide rails 43 controlling the path of the packer piston. These rails comprise an inner solid core 43' arranged parallel to one another adjacent the opposite sides of bin bottom 38 and are bolted, riveted, or welded thereto. Suitably secured against the top surfaces of these members is an inverted channel-shaped bearing member 43″. The exterior surface of this bearing member is smoothly finished and nests within a complementally shaped bearing member 47 rigidly anchored to the underside of the packer piston head as will be described more fully presently. Bearing members 47 are best shown in FIGURE 8 and are relatively short as compared to guide rails 43, 43.

The packer piston, designated generally 45, has a vertical end wall 46 extending transversely of the interior width of bin 27 and reciprocates lengthwise of guide rails 43 between the fully retracted position shown in FIGURES 8 and 9 and the fully extended position shown in FIGURES 1, 2 and 3. As will be recognized, this piston is effective to engage a collection of refuse in bin 27 and to transfer this refuse rearwardly across the bottom of the bin through openings 20, 21 into storage compartment 17 and, in so doing, to compress and compact this refuse against other refuse previously transferred into the storage compartment as well as to distribute and elevate compacted refuse previously deposited in the latter compartment. Another function of the packer piston to be explained more fully presently is to support other refuse present in the overlying portion of bin 27 until the piston is retracted to receive another charge.

Piston 45, desirably somewhat less than one foot in height, is fabricated in any suitable manner from structural elements and sheet metal welded or otherwise suitably secured together. The principal members include refuse engaging rear wall 46, a pair of side walls 50, 50 the relatively narrow lower wall 51, and a top wall 52 rigidly secured together. The relatively short inverted channel-like bearing members 47, 47 (FIGURES 3 and 8) seated astride guide rails 43, 43 are secured to the interior of walls 46, 51 and cooperate therewith in constraining the packer to a straight path of movement despite widely varying and unequal loading of the packer sometimes occurring.

Referring now to FIGURES 3 and 5 it is pointed out that the rear half 52 of the piston top wall is rigidly secured in place but forward half 54 must be movably supported in order to be displaced relative to portion 52 during reciprocation of the piston. As here shown by way of example, halves 52, 54 are movably connected together by a hinge 55 extending transversely of the piston and are sufficiently wide that, taken together, they provide a support for overlying refuse when the piston is fully extended as shown in FIGURE 3.

Displacement of cover half 54 to a collapsed position in the retracted position of the piston is accomplished as herein illustrated by a pair of rollers 58, 58 mounted on stub shafts projecting from the opposite ends of cover half 54 as is shown in FIGURE 6. These rollers are arranged to roll between the flanges of inturned channel-shaped guide members 59 mounted on bin side walls 29, 31 (FIGURES 3 and 9). One leg 60 of these channel members projects horizontally toward the rear of the vehicle whereas the other leg 61 extends vertically along the forward end wall 28 of the bin and are connected by an intervening arcuate section. It will thus be apparent that, as the piston retracts, rollers 58, 58 roll along in horizontal legs 60, 60 of the channels and then gradually lift cover 54 vertically as the rollers pass along the arcuate portions and into vertical legs 61.

The power means for operating piston 45 comprises a pair of identical hydraulic cylinder assemblies 65, 65 the forward ends of each having a mounting stud 62 provided with a transverse opening through which the clevis pin 63 is inserted. Pin 63 is supported in a clevis type bracket 64 anchored to the framework of device 15. The piston rod 66 for each cylinder is similarly pivotally connected by a pin 67 (FIGURES 8, 9) to a bracket 68 rigidly secured to the interior side of piston head or end wall 46.

It will be recognized from the foregoing that fluid operated cylinders 65, 65 are mounted at an acute angle to one another as well as to the longitudinal axis of the refuse vehicle. This provides for a maximum piston stroke as well as for the retraction of the piston to occupy a minimum space at the forward end of the packer apparatus. These two conditions are graphically illustrated in FIGURES 2 and 8, the one showing the piston fully extended and the latter showing the piston fully retracted and occupying a minimum space across and confined to the forward lower corner of bin 27.

Although as herein illustrated and described, the forward ends of the cylinders are connected to the opposite lateral sides of apparatus 15 adjacent its forward end wall, it will be appreciated that equivalent benefits and advantages are obtainable by anchoring the forward ends 62, 62 of these cylinders centrally of the transverse front wall of the apparatus frame and their piston rod ends 66, 66 to the opposite lateral ends of the packer head, i.e. end wall 46. Each of these arrangements of the cylinders has certain attending advantages readily recognized by persons skilled in this art.

Referring now more particularly to FIGURES 2, 3, 7 and 9, it is pointed out that there is affixed to the undersid of the piston top walls 52, 54 a pair of aligned channel-shaped downwardly facing guide members 70, 71. These guide channels have a sliding fit within an upturned channel shaped bearing member 72 (FIGURES 2, 3, 7) welded or otherwise secured to a channel member 73. Projecting downwardly from and fixed to the midportion of the latter is a tubular shank 74 journalled or socketed within aligned openings 75 formed in a downturned channel member 76 resting against the top of an upright bracket 77. This bracket is supported by and welded to bottom 38 of the refuse bin.

The central guide assembly just described will be recognized as performing important stabilizing and guide functions in cooperation with guide members 47, 47 forming part of the piston head. Together these three guides assure the smooth and accurate reciprocal movement of the piston at all times and irrespective of uneven loading conditions which can occur at its opposite ends. Additionally, the described piston guide and bearing assemblies permit the packer piston sub-assembly to be easily assembled and disassembled within the bottom of bin 27. Removal of the sub-assembly is easily accomplished by detaching the pivot pins for cylinders 65, 65 and simply lifting the piston proper upwardly away from the side guide members 43, 43 and central guide member 76 supported on bracket 77.

Fluid flow to the opposite ends of the cylinders 65 is provided for in the usual manner through flexible hoses 80 (FIGURE 3) connected to a source of pressurized fluid (not shown) maintained by the vehicle engine. The control of pressurized fluid to either end of the cylinders is regulated by suitable valves such as a three-way valve (not shown) arranged to be operated by control levers 81, 81 mounted in side walls 29 and 31 of the refuse bin. Or, if desired, the valve control handles may be arranged at any other point, such as in the driver's cab.

There remains to be described the inclined guide and access partition designated generally 85 (FIGURES 1, 3 and 9) and extending transversely of the lower forward corner of bin 27 and overlying substantially the entire piston sub-assembly in its retracted position. As here shown, guide partition 85 includes an upper half welded in place against the interior surfaces of the bin walls and a lower half 86 hinged to the upper half at 87. The lower edge of this cover is preferably welded to inverted angle iron member 88 which serves to reinforce the edge of the cover and to support the weight of overlying refuse enroute to a charging position behind the packer piston. It will be appreciated that when cover 86 is pivoted upwardly and forwardly against half 85 free and unobstructed access is had to piston 45 for inspection and servicing. When closed downwardly the reinforcing angle iron 88 is positioned closely above piston top wall 54 as clearly appears in FIGURE 3.

The operation of the described refuse handling vehicle 10 will be quite apparent from the foregoing detailed description of its construction and the structural and functional relationship of the components with one another. The described unitary packer and refuse transfer unit 15 is quickly and easily installed in any conventional truck chassis merely by providing bolt holes in chassis frame 12 for mounting bolts 36. Thereafter the unit is lowered against these frame members and bolted securely in place. Appropriate connections for the cylinders 65, 65 are also made to the vehicle power take-off facilities.

The storage compartment assembly and its operating power unit are likewise installed in known manner on the frame immediately rearward of wall 30 of bin 27.

Refuse dumped into the bin from the side thereof gravitates downwardly into the path of the packer aided by the inclined partition 85, 86. After a quantity has accumulated, valve handle 81 is operated to admit fluid to cylinders 65, 65 thereby advancing the piston rearwardly to crush the refuse while transferring it through openings 20, 21 into storage chamber 17. The advance of the piston is accompanied by the transfer of the folding top half 54 of the piston from its collapsed position shown in FIGURE 9 to the position shown in FIGURE 3 wherein it is effective to support refuse in bin 27 at a level above the packer piston until the latter is retracted for recharging and the next operating cycle.

During both strokes of the packer piston the central guide unit 71 to 77 cooperates with the pair of guide rails 43, 43 in confining movement of the piston to a straight path and against any tendency to twist or jam owing to unequal loading or other cause.

While the particular rubbish collecting vehicle with loading and packing apparatus herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A refuse collecting vehicle of the front loading type having a motor propelled chassis equipped with a driver compartment at its forward end, a refuse handling compartment immediately rearward of said driver compartment equipped with power driven pusher means for transferring refuse rearwardly into the bottom of a large capacity storage compartment mounted on the rear of said chassis, a pair of fluid-powered cylinders confined to the bottom of said refuse handling compartment operating in parallel to reciprocate said pusher means and arranged in a substantially horizontal plane with their axes lying at an angle to one another, pivot means connecting the forward ends of said cylinders to the opposite lateral sides of said refuse handling compartment and their rear ends to the central portion of said pusher means, means for supplying pressurized fluid to either end of said cylinders and selectively operable to extend and to retract said pusher means, said cylinders being operable to reciprocate said pusher means back and forth across the bottom of the rearward half of said refuse handling compartment, said pusher including an upwardly pivoting top wall at its forward end, and means for pivoting said top wall into a generally vertical plane at the rear of said driver compartment as said pusher means is withdrawn to its retracted position at the forward end of said refuse handling compartment.

2. In combination with a truck chassis of the type having a conventional driver's cab at its forward end and an upwardly and rearwardly dumping refuse storage compartment pivotally mounted on its rear end, a self-contained refuse loading apparatus mounted on said chassis between said driver's cab and the lower forward end of said storage compartment and installable on said chassis without need for modifying the structure of said driver's cab, said apparatus having a refuse receiving bin provided with packer means movable to and fro lengthwise of said chassis and effective to transfer refuse from said bin into the lower forward corner of said storage compartment during the rearward stroke thereof, a pair of horizontally disposed fluid-powered cylinders for reciprocating said packer, means pivotally connecting the front ends of said pair of cylinders to the opposite lateral sides of said refuse loading apparatus adjacent the lower forward corners thereof and their rear ends to the rear central end portion of said packer, said cylinders being operable to reciprocate said packer to and fro in a path confined largely to the rearward half of said refuse bin, said packer including a rear end wall extending transversely of said bin and chassis and effective to force refuse rearwardly into the lower portion of said storage compartment and having a generally horizontal top wall extending forwardly from the upper transverse edge of said rear wall, said top wall including a fixed rear half and a pivoting forward half cooperating with one another to support refuse in said bin at a level overlying said packer during the advance stroke thereof, and means for pivoting the forward half of said top toward an upright plane as the packer approaches the end of its retraction stroke.

3. The combination defined in claim 2 characterized in the provision of a plurality of guideway means lying parallel to one another adjacent the opposite sides of said bin and each including a stationary portion having sliding engagement with an overlying movable portion carried by the lower portion of said packer, said guideway means cooperating to restrict the movement of said packer to a straight to-and-fro path lying parallel to the length of said chassis.

4. A self-contained combined refuse receiving, compacting and loading apparatus comprising, a unitary assembly attachable as a unit immediately behind the rear wall of the driver's cab of a truck chassis without need for altering the cab in any substantial manner, said apparatus including as a unitary part thereof a refuse receiving bin having an outlet opening in the lower corner of its rearwardly facing end wall, a low height packer piston means reciprocable lengthwise of a truck chassis supported in the bottom of said bin for compacting and transferring refuse outwardly through said outlet opening, said packer-piston means having a rigid heavy duty vertically-disposed head extending across its rear end and a two-part top wall extending forwardly from the upper edge of said head, one part of said top wall being fixed across the rear portion thereof, the other part of said top wall being movable relative to said one part between an operating extended position and a collapsed non-operating position, and a pair of power cylinders connected at their rear ends to said packer and their forward ends to the opposite lateral sides of said apparatus adjacent the front of said apparatus.

5. A self-contained refuse loading apparatus as defined in claim 4 characterized in that said power cylinders have their longitudinal axes lying in a generally horizontal plane near the bottom of said bin and inclined acutely to a median vertical plane through the path of travel of said packer piston means, means pivotally anchoring the opposite ends of said power cylinders to said frame and to said packer head with one pair of ends being spaced closely to said median plane and the other pair of ends being spaced remotely from the opposite sides of said median plane.

6. Refuse loading apparatus adapted to be rigidly mounted as a unit on a truck chassis between the driver cab and a rearwardly tilting and discharging refuse storage compartment having a refuse inlet from said loading apparatus across its lower forward corner, said loading apparatus including a main frame and refuse receiving bin having its lateral sides parallel to the sides of said truck chassis, packer means slideaway along the bottom of said bin toward and away from the refuse inlet of said storage compartment to transfer refuse thereinto and having a top wall formed in a rear half and a forward half, said halves being relatively movable and supplementing one another to provide a temporary bottom for said bin when said packer is advancing and being collapsible to occupy a greatly reduced cross-sectional area across the forward portion of said bin as said packer is retracting, a pair of power cylinders for moving said packer to and fro and arranged with axes diverging acutely to either side of a vertical median plane bisecting the path of travel of said packer, and means pivotally connecting the ends of said cylinders to said main frame and to said packer with one pair of pivot connections closely spaced to said median plane and the other pair of pivot connections remotely spaced from the opposite sides of said median plane.

7. Refuse loading apparatus as defined in claim 6 characterized in the provision of guideway means between said packer and said bin frame cooperating to guide said packer and constrain the same to move in a straight path parallel to said median plane.

8. Refuse loading apparatus as defined in claim 6 characterized in that the two parts of said packer top wall are connected by a hinge, and guide means operable to hinge the forward half of said top wall upwardly toward a generally upright position as said packer approaches its fully retracted position.

9. Refuse loading apparatus as defined in claim 8 characterized in the provision of an inclined wall for said bin extending transversely of the forward lower corner thereof and having its lower rear edge closely spaced above said packer top wall in the retracted position of the packer and effective to guide refuse downwardly into the path of advance of the packer while the packer is retracted.

10. Refuse loading apparatus as defined in claim 7 characterized in that said packer means are removable as a unitary sub-assembly through the top of said refuse bin.

11. Refuse loading and compacting apparatus suitable for mounting on a truck comprising, means forming a refuse receiving bin adapted to be located immediately rearward of the driver's compartment of said truck and having a low-height outlet opening across the lower rear corner thereof opening into the lower forward corner of a main refuse storage compartment mounted on said truck rearward of said bin, packer piston means movably supported in the bottom of said bin for transferring refuse from said bin into said storage compartment and for compacting said refuse against refuse previously transferred into said compartment, said piston means having a plurality of plates connected to the upper edge portion thereof and movable with said piston means to form a temporary floor for said bin during the operating stroke of said piston means, means for folding at least one of said plates upwardly toward the interior of the front wall of said bin as said piston means is retracted and for unfolding said one plate to a generally horizontal position as said piston means is retracted, and cylinder means for moving said piston means between the retracted and extended positions thereof.

12. Refuse loading and compacting apparatus as defined in claim 11 characterized in the provision of cover means overlying said piston means and said plates in the retracted position thereof and useful in guiding refuse rearwardly into the path of travel of said piston means as it is extended.

13. Refuse loading and compacting apparatus as defined in claim 11 characterized in the provision of cover means supported crosswise of the lower forward corner of said refuse bin closely above said piston means in the retracted position of the latter, said cover means including a pair of plate means hinged together along their adjacent edges, the one of said plate means closest to said piston means being pivotable upwardly toward the top of said bin but normally having its lower edge positioned close to said piston means, and the other of said plate means being normally supported immovably relative to the walls of said refuse bin.

14. Refuse loading and compacting apparatus as defined in claim 11 characterized in the provision of a pair of guide channels along the sides of said bin, said guide channels cooperating with means carried by the forward one of the plates connected with said piston means to fold said forward plate upwardly as said piston means is retracted.

15. Refuse loading and compacting apparatus as defined in claim 11 characterized in that said cylinder means includes a pair of fluid-operated cylinders supported generally horizontally in the lower forward corner of said bin with their forward ends connected to said bin adjacent the opposite sides thereof and their rear ends connected to said piston means adjacent the transverse center portion thereof.

References Cited by the Examiner
UNITED STATES PATENTS

| | | | |
|---|---|---|---|
| 2,430,973 | 11/47 | Boissonnault | 214—518 |
| 2,800,234 | 7/57 | Herpich et al. | 214—82 |
| 2,961,105 | 11/60 | Shubin | 214—83.3 |
| 2,996,203 | 8/61 | Rosaia | 214—82 |
| 3,062,294 | 11/62 | Bowles | 214—83.3 |

HUGO O. SHULZ, *Primary Examiner.*

GERALD M. FORLENZA, *Examiner.*